United States Patent [19]

Cubalchini et al.

[11] Patent Number: 5,060,175
[45] Date of Patent: Oct. 22, 1991

[54] MEASUREMENT AND CONTROL SYSTEM FOR SCANNING SENSORS

[75] Inventors: Ronald Cubalchini, Torrance; William G. McArthur, Rancho Palos Verdes; Paul E. Craft, Jr., Canoga Park; Arthur K. Rue, Rancho Palos Verdes, all of Calif.

[73] Assignee: Hughes Aircraft Company, Los Angeles, Calif.

[21] Appl. No.: 309,640

[22] Filed: Feb. 13, 1989

[51] Int. Cl.$^5$ .............................................. G06F 15/50
[52] U.S. Cl. ...................................... 364/559; 33/318; 364/579
[58] Field of Search ............... 364/449, 453, 454, 434, 364/456, 550, 551.01, 579, 559; 73/178 R; 74/5.34, 5.37; 342/359, 443, 449; 33/318, 328

[56] References Cited

U.S. PATENT DOCUMENTS

| | | | |
|---|---|---|---|
| 4,032,759 | 6/1977 | Danik | 364/453 |
| 4,038,527 | 7/1977 | Brodie et al. | 364/453 |
| 4,112,755 | 9/1978 | Sullivan | 73/178 R |
| 4,134,681 | 1/1979 | Elmer | 364/434 |
| 4,168,524 | 9/1979 | Soltz et al. | 364/456 |
| 4,212,443 | 7/1980 | Duncan et al. | 364/453 |
| 4,254,465 | 3/1981 | Land | 364/453 |
| 4,320,287 | 3/1982 | Rawicz | 364/459 |
| 4,347,573 | 8/1982 | Friedland | 364/453 |
| 4,445,376 | 5/1984 | Merhav | 364/453 |
| 4,583,178 | 4/1986 | Ameen et al. | 364/453 |
| 4,608,641 | 8/1986 | Snell | 364/453 |
| 4,675,820 | 6/1987 | Smith et al. | 364/453 |
| 4,689,748 | 8/1987 | Hofmann | 364/456 |
| 4,783,744 | 11/1988 | Yueh | 364/454 |
| 4,791,573 | 12/1988 | Zemany et al. | 364/453 |
| 4,823,134 | 4/1989 | James et al. | 342/359 |
| 4,823,626 | 4/1989 | Hartmann et al. | 74/5.34 |

Primary Examiner—Parshotam S. Lall
Assistant Examiner—Michael Zanelli
Attorney, Agent, or Firm—William J. Streeter; Wanda K. Denson-Low

[57] ABSTRACT

A sensor may be scanned relative to any arbitrarily selected reference coordinate system by the use of a system including an attitude determination unit, attitude control unit, inertial measurement unit, navigation unit, and a scan generation unit. Methods are also employed, in this system, for reducing errors and increasing the accuracy of the scan of the sensor. These methods include the use of gyroscopes having no cross axis coupling or inherent limit on their angular speed, a Kalman filter to reduce system errors, continually estimating solutions to the strapdown equation, and a dual loop control system utilizing both rate and position signals which issues motion control commands to the sensor.

25 Claims, 2 Drawing Sheets

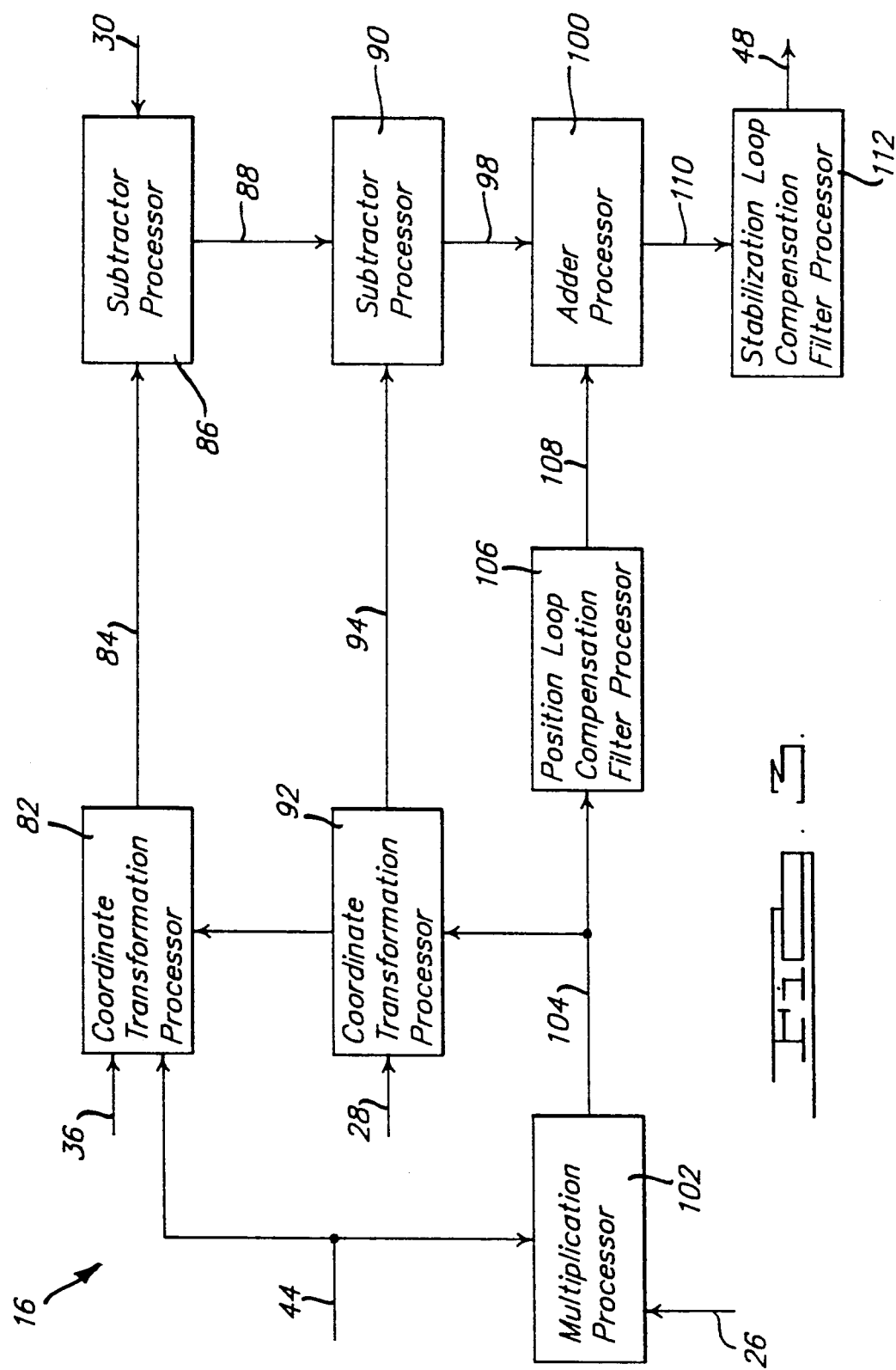

MEASUREMENT AND CONTROL SYSTEM FOR SCANNING SENSORS

This invention was made with Government support under contract DASG 60-84-C-0068 awarded by the Department of the Army. The Government has certain rights in this invention.

BACKGROUND OF THE INVENTION

1. Field of the Invention

This invention relates to a measurement and control system for scanning sensors, and more particularly, to an accurate measurement and control system which allows a sensor to be scanned with respect to any arbitrarily selected reference coordinate system.

2. Discussion

Precision measurement and control systems for scanning sensors are used in a wide variety of applications in which detection of objects is needed. These systems provide for the positioning and scanning of a sensor along a predefined scan path. The sensor is capable of detecting any object coming into its field of view. The sensor may be moved along this scan path at a variety of angular rates. High angular rates are desirable, particularly at "turnaround" in which the sensor has completed its scan path and must be quickly returned to the initial scanning point.

Previous measurement and control systems for scanning sensors were generally limited to scanning the sensor relative to base referenced or inertial coordinate systems. These previous systems were typically implemented in one of two ways. The first implementation employed rate integrating gyroscopes, one of which was mounted to the scanned object such that its input axis was along the desired scan axis. An electronic signal, proportional to the desired scan rate, was applied to torquers which were mounted on the gyroscope. The output of the gyroscope was proportional to the error between the desired scan rate and the actual scan rate. This error signal was then used as an input to a rate control loop which provided torque commands to the torquers to adjust for the error. Two or three rate integrating gyroscopes could be mounted orthogonally on the sensor in order to cause the sensor to scan in two or three dimensions.

This implementation had three major limitations associated with it. The gyroscopes produced outputs if they were moved about any axis, not just the desired scan axis. These outputs, associated with cross-axis coupling, introduced error into the system by producing incorrect scan rate error signals. Secondly, during times of high angular acceleration of the sensor, the output signals of the gyroscopes weren't representative of the gyroscopic motion. These output signals were in error and produced corresponding system errors. Lastly, the sensor could only be scanned relative to an inertial coordinate system.

The second implementation utilized a precision relative angular measuring device such as a resolver, an inductosyn, or a shaft encoder. These devices were used to measure the position of a rotor shaft relative to its case. The output signal of these devices was subtracted from a position command, which was previously input to the sensor, thereby producing an error signal. This error signal was then used in a position control loop to control the position of the sensor. The difficulty associated with this implementation was that the mechanical compliance between the controlled shaft axis and the sensor line of sight limited the accuracy of these systems since the quantity that was measured (i.e. shaft angle) was not the quantity that was desired to be controlled (i.e. the angle that the sensor makes with respect to its base). Furthermore, normally this implementation could only scan relative to a coordinate system which was referenced to the base of the sensor. However, if one knew the orientation of the sensor's base with respect to a selected reference coordinate system, the sensor, in this implementation, could be scanned relative to this arbitrary reference coordinate system.

SUMMARY OF THE INVENTION

According to the teachings of the present invention, a sensor may be scanned relative to any arbitrarily selected reference coordinate system without the necessity of knowing the orientation of the sensor's base relative to this reference coordinate system. Furthermore, this reference system may also be moving relative to an inertial coordinate system.

In the preferred embodiment this is accomplished by first selecting a reference coordinate system. The sequence of orientations of the reference coordinate system relative to a desired sensor coordinate system is computed and input to an attitude control unit. The sequence of angular rates of the desired sensor coordinate system relative to the reference coordinate system, expressed in the desired sensor coordinate system is also computed and input to the attitude control unit. An inertial measurement unit is used to measure the angular rate of a sensor coordinate system relative to an inertial coordinate system, expressed in the sensor coordinate system. The inertial measurement unit inputs this measurement to the attitude control unit and to an attitude determination unit. The angular rate of the reference coordinate system relative to the inertial coordinate system, expressed in the reference coordinate system is measured and input to the attitude control unit. The orientation of the inertial coordinate system relative to the reference coordinate system is measured and input to the attitude determination unit. The initial position of the inertial coordinate system relative to the sensor coordinate system is input to the attitude determination unit. The attitude determination unit generates the orientation of the sensor coordinate system relative to the reference coordinate system and inputs this orientation to the attitude control unit. Finally, the attitude control unit issues motion control commands to the sensor.

Further techniques employed in connection with this invention reduce errors related to the scanning of the sensor. These techniques are applicable to any measurement and control system for scanning sensors and represent an improvement over the prior art. For example, gyroscopes, having no cross axis coupling and no inherent limit upon their angular accelerations, are used in the inertial measurement unit. This greatly improves accuracy of sensor placement within its scan pattern because of elimination of aforementioned errors associated with cross axis coupling and high angular rate of gyroscopes.

A dual loop control system is used in the attitude control unit. This control system, which utilizes both rate and position input command signals, results in increased accuracy in placement of the sensor in its scan pattern.

Estimation of the strapdown equation is accomplished by the attitude determination unit to give a more accurate estimate of the position of the inertial coordinate system relative to the sensor coordinate system. Because the gyroscopes utilized within the inertial measurement unit provide accurate output signals through all angular acceleration rates, the solutions of the strapdown equation may be continuously estimated. This continual estimation further increases the accuracy of the sensor scan pattern.

Finally, a Kalman filter is used within the attitude determination unit to reduce errors associated with the estimation of the solutions to the strapdown equation, the inertial measurement unit measurement process the initial orientation of the inertial coordinate system relative to the sensor coordinate system, errors in a fiducial detection process, and in the alignment between the sensor line of sight coordinate system and the sensor coordinate system.

BRIEF DESCRIPTION OF THE DRAWINGS

The various advantages of the present invention will become apparent to those skilled in the art by reading he following specifications and by reference to the drawings in which:

FIG. 3 is a diagram of an attitude control unit made in accordance with the teachings of the preferred embodiment of this invention.

DESCRIPTION OF THE PREFERRED EMBODIMENTS

Figure 1:
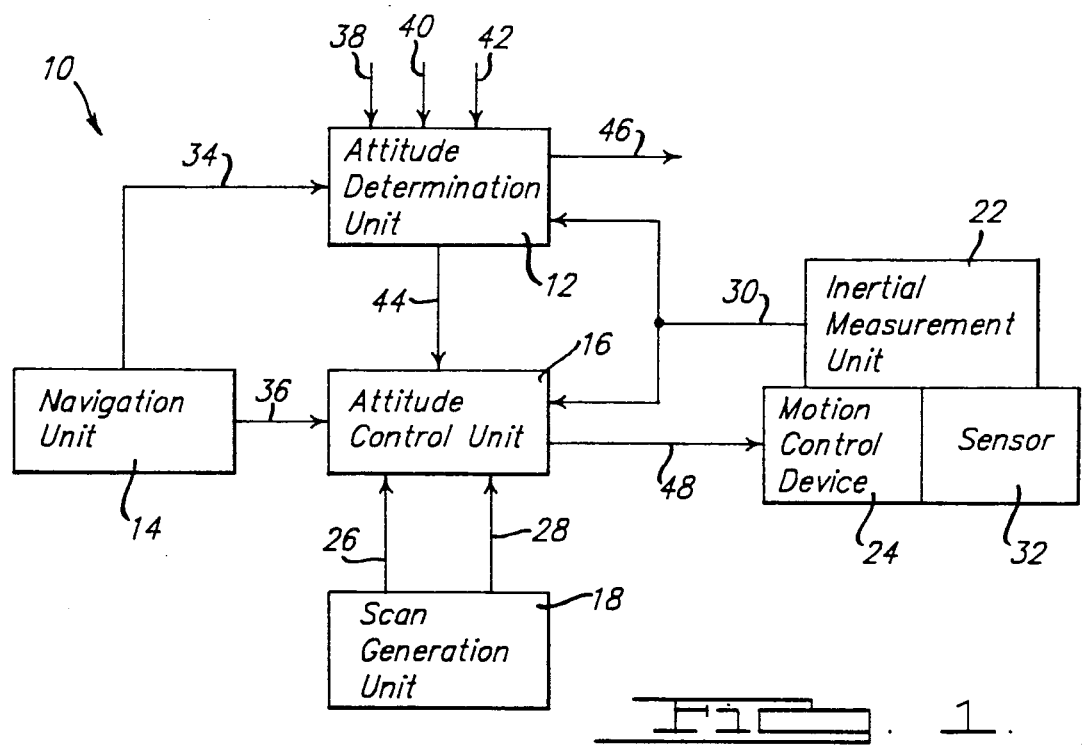
FIG. 1 is a diagram of a measurement and control system made in accordance with the teachings of the preferred embodiment of this invention.

Turning now to FIG. 1, a measurement and control system 10, which causes a sensor to follow any arbitrary motion defined relative to any arbitrarily selected reference coordinate system is shown. The measurement and control system 10 has an attitude determination unit 12, a navigation unit 14, an attitude control unit 16, a scan generation unit 18, a scanned sensor 32, an inertial measurement unit 22, and sensor motion control device 24.

Before analyzing this embodiment, an overview of the coordinate systems used in the operation of the measurement and control system 10 is in order. The reference coordinate system may be arbitrarily selected. The reference coordinate system may even be moving relative to an inertial coordinate system. The inertial coordinate system is defined relative to a body that is fixed in space. The sensor line of sight coordinate system is defined relative to points within the sensor's 32 field of view. The sensor coordinate system is defined relative to the body of the sensor 32. The desired sensor coordinate system is also defined relative to the body of sensor 32.

The scan generation unit 18 is a processing device which provides a sensor scan pattern to the attitude control unit 16. The scan pattern is a sequence of positions, signal 26, and angular rates, signal 28, associated with the movement of sensor 32. The positions of signal 26 are defined in terms of the orientation of the reference coordinate system with respect to the desired coordinate system. The angular rates of signal 28 are defined to be the angular rate of the desired sensor coordinate system relative to the reference coordinate system and expressed in the desired sensor coordinate system.

The inertial measurement unit 22 is implemented with a set of at least three gyroscopes which measure the angular rate or the incremental angle of the sensor coordinate system with respect to the inertial coordinate system. This rate or incremental angle is expressed in the sensor coordinate system. This angular rate output, shown is signal 30, is coupled to the attitude determination unit 12 and to the attitude control unit 16.

The inertial measurement unit 22 is physically attached to the sensor 32 so that both of them rotate as a single body. The gyroscopes used within the inertial measurement unit 22 contain no cross axis coupling and provide reliable output signals at all angular rates associated with the sensor 32. Examples of such devices include ring laser gyroscopes and fiber optic gyroscopes.

The navigation unit 14 measures the position of the inertial coordinate system relative to the reference coordinate system and provides this measurement, signal 34, to the attitude determination unit 12. The navigation unit 14 also measures the angular rate of the reference coordinate system relative to the inertial coordinate system and expresses this measurement in terms of the reference coordinate system. This measurement, signal 36, is input to the attitude control unit 16. Alternatively, the navigation unit 14 may be implemented using a computer processor which analytically determines the aforementioned position and rate values without the need for measurement instrumentation.

The attitude determination unit 12 also has signal inputs which represent the initial orientation of the inertial coordinate system relative to the sensor coordinate system, the initial orientation of the sensor line of sight coordinate system relative to the sensor coordinate system, and a fiducial residual. These signals are designated as 38, 40 and 42 respectively in FIG. 1. The fiducial residual signal 42 represents the error associated with the measurement of a body's position. This body, which is detected by the scanned sensor 32, is at an apriori known location. Any deviation, in system measurement, relative to this body's known location represents system measurement error.

The attitude determination unit 12 generates signals 44 and 46 which represent the orientation of the sensor coordinate system relative to the reference coordinate system and the orientation of the sensor line of sight coordinate system relative to the reference coordinate system respectively. Signal 44 is input to the attitude control unit 16 and signal 46 is available to be used by the sensor or any other device residing in the system 10.

The attitude control unit 16, upon processing input signals 26, 28, 30, 36 and 44 generates output signal 48 which represents motion control commands to torquers, or other motion devices 24, which are physically attached to the sensor 32. These motion devices 24 cause the sensor 32 to change position and angular rate. These command signals 48 are generated in order to have the sensor 32 scan relative to the scan pattern represented by signals 26 and 28. All signal interconnection between the units of FIG. 1 is accomplished by the use of electronic circuitry.

Figure 2:
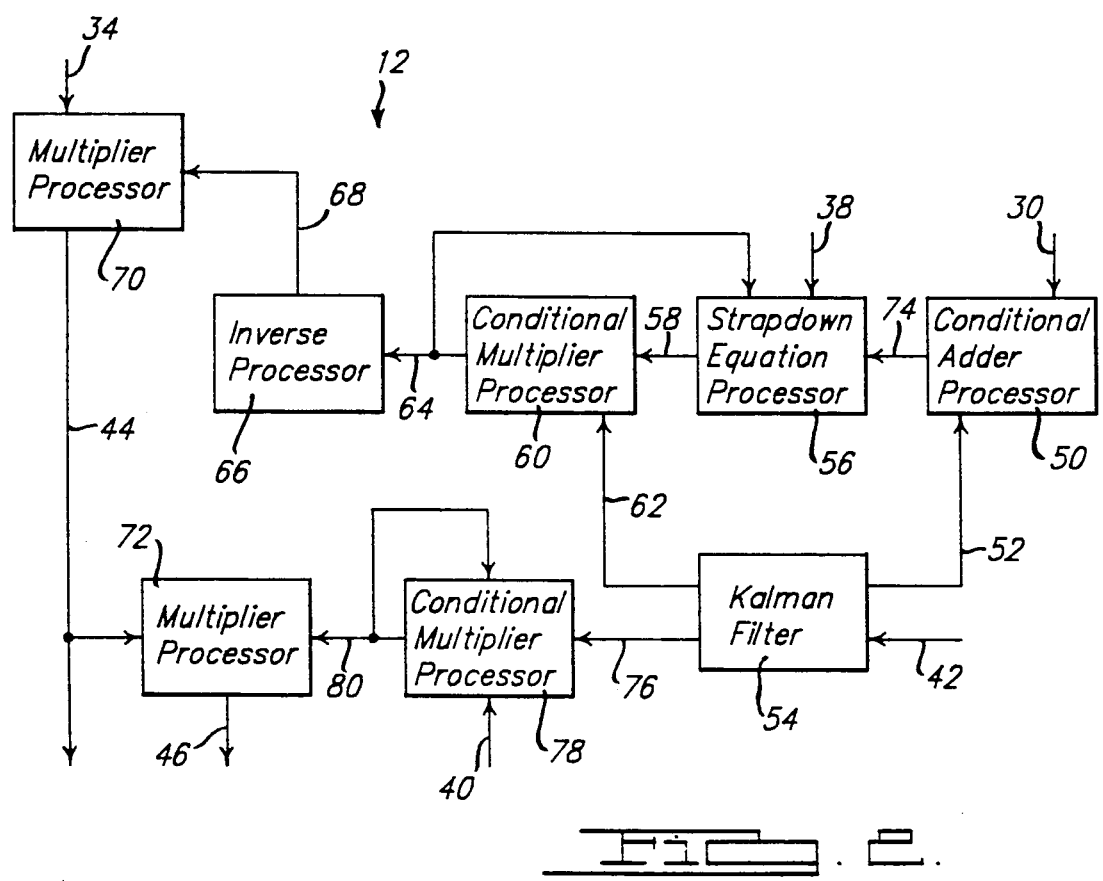
FIG. 2 is a diagram of an attitude determination unit made in accordance with the teachings of the preferred embodiment of this invention.

FIG. 2 is a diagram of the attitude determination unit 12. Signal 30, the inertial rate of the sensor expressed in sensor coordinates, is input from the inertial measurement unit 22 to conditional adder processor 50. Output signal 22 from Kalman filter 54 is also input to processor 50. Processor 50 modifies signal 30 to correct for measurement errors associated with the gyroscopes of inertial measurement unit 22. This correction is accomplished by adding signals 30 and 52 together whenever a correction signal 52 is calculated by the Kalman filter. Signal 74, representing the corrected signal, is input to strapdown equation processor 56. Processor 56, to which is also input signal 38 (the estimated initial orientation of the inertial coordinate system relative to the sensor coordinate system), generates an estimation of the orientation of the inertial coordinate system relative to the current sensor coordinate system orientation. This generated signal 58 is input to conditional multiplier processor 60. Because the gyroscopes of the inertial measurement unit 22 provide accurate output signals 30, even through periods of high sensor 32 angular rate, the strapdown equation may be continuously solved by processor 56 providing a more accurate scan of sensor 32 and a continual generation of output signal 58.

Signal 62, represents a corrected estimation of the orientation of the inertial coordinate system relative to the current orientation of the inertial coordinate system. Signal 62 is also input to processor 60 when available. Signals 62 and 58 are multiplied together by processor 60 and output signal 64 is input to inverse processor 66 and processor 56. Signal 64 is the corrected estimate of the orientation of the inertial coordinate system relative to the sensor coordinate system. Processor 56 utilizes signal 64 to propagate the estimated solution to the strapdown equation for the next time step.

Processor 66 performs an inverse operation upon signal 64 and produces output signal 68, representing the orientation of the sensor coordinate system relative to the inertial coordinate system. Signal 68 is input to multiplier processor 70. Signal 34 (the orientation of the inertial coordinate system relative to the reference coordinate system) emanating from the navigation unit 14, is also input to processor 70. Processor 70 multiplies signals 34 and 68 and produces signal 44 which is input to the attitude control unit 18 and to processor 72. Signal 44 is the estimate of the orientation of the sensor coordinate system relative to the reference coordinate system.

Kalman filter 54 also generates signal 76 which represents a corrected estimate of the orientation of the sensor line of sight coordinate system relative to the current orientation of the sensor line of sight coordinate system. Signal 76 and signal 80 are both input to conditional multiplier processor 78 which multiplies the to signals (76 and 80) producing an updated output signal 80. Signal 80 represents the orientation of the sensor line of sight coordinate system relative to the sensor coordinate system. Initially this is set equal to signal 40. Signal 80 is input to processor 72. Signal 80 is also input back to processor 78 in order to enable processor 78 to accumulate the error corrections. Processor 72 multiplies signals 44 and 80 and produces output signal 46, the estimate of the orientation of the line of sight coordinate system relative to the reference coordinate system, which may be used by the sensor or any other device.

Kalman filter 54 contains a model of the measurement process. This process represents the sequence of operations needed to determine the location of a body which has been viewed by sensor 32. Fiducial residual signal 42 is input to Kalman filter 54. Signal 42 represents the error associated with the measured position of a known body, which has been viewed by sensor 32, and the body's known position. Kalman filter 54 uses this measurement model and the fiducial residual signal 42 to produce signals which are used to estimate error contributions associated with various parts of the attitude determination unit 12.

For example, signal 52 is used to estimate errors in measurements made by the gyroscopes of the inertial measurement unit 22. Signal 62 is used to estimate errors associated with the solution and initial condition (signal 38) of the strapdown equation. Signal 76 is used to estimate errors associated with the orientation of the sensor line of sight coordinate system and the sensor coordinate system. Another output signal (not shown) of Kalman filter 54 is used to estimate errors associated with the sensor's 32 detection of the fiducial object itself.

All processors of the attitude determination unit 12 may be connected by electronic circuitry. The Kalman filter provides signals 52, 62, and 76 only when the sensor 32 detects a fiducial body. If no fiducial body has been detected processors 50 and 60 allow input signals 30 and 58 respectively to pass through with no processing applied to them and signal 80 remains constant Thus, as shown in FIG. 2 signals 44 and 46 are produced by the attitude determination unit 12 without any error correction. It should be realized that the Kalman filter 54 may be placed anywhere in system 10 and may allow for error correction of any of the aforementioned signals of system 10. Furthermore, in order to achieve high error correction performance, Kalman filter 54 should be made to calculate errors associated with the system's 10 measuring process (i.e. within the attitude determination unit 12) and with the sensing process associated with the detection of the fiducial body. This increases performance because errors associated with the fiducial detection process are not attributed to the system 10 measurement process thereby resulting in "over correction".

FIG. 3 is a diagram of the attitude control unit 16. Signals 36, the inertial rate of the reference coordinate system expressed in reference coordinates (from the navigation unit 14), and 44, the orientation of the sensor coordinate system relative to the reference coordinate system (from the attitude determination unit 12), are input to coordinate transformation processor 82 which utilizes signal 44 in order to perform a coordinate transformation operation upon signal 36. Signal 84 is output from processor 82 and represents the angular rate of the reference coordinate system relative to the inertial coordinate system. Signal 84 is expressed in terms of the sensor coordinate system. Signal 84 and signal 30 (from the inertial measurement unit 22) are both input to subtracter processor 86. Processor 86 subtracts signal 84 from signal 30 and generates signal 88 which represents the angular rate of the sensor coordinate system relative to the reference coordinate system. Signal 88 is expressed in terms of the sensor coordinate system. Signal 88 is input to subtracter processor 90.

Signal 28, the angular rate of the desired sensor coordinate system relative to the reference coordinate system and expressed in the desired sensor coordinate system is input, from the scan generation unit 18, to coordinate transformation processor 92 which performs a coordinate transformation operation on the signal 28 from desired sensor coordinates to actual sensor coordinates. Signal 94, representing the angular rate of the desired sensor coordinate system relative to the reference coordinate system and expressed in the sensor coordinate system, is input to processor 90. Processor 90 subtracts signal 88 from signal 94 and provides an output signal 98. Signal 98, representing the angular rate of the desired sensor coordinate system relative to the sensor coordinate system and expressed in terms of the sensor coordinate system, is input into adder processor 100. Signal 98 represents the output of a rate control loop. Signal 98 is the error associated with the current angular rate of the sensor 32 relative to the rate needed to conform to the scan pattern.

Signal 26, the orientation of the reference coordinate system relative to the desired sensor coordinate system, emanating from the scan generation unit 18, and signal 44, emanating from the attitude determination unit 12, are both input to multiplication processor 102. Multiplication of signals 44 and 26 is accomplished by processor 102 resulting in output signal 104. Signal 104 represents the position of the sensor coordinate system relative to the desired sensor coordinate system. Signal 104 is the output of a position control loop and is the error associated with the current position of the sensor 32 relative to the position needed to conform to the scan pattern.

Signal 104 is input to position loop compensation filter processor 106, which compensates the signal, and to processor 92 to allow the processor 92 to effect its aforementioned coordinate transformation process. The signal output of processor 106, representing amplitude and phase angle adjustment of signal 104, shown as signal 108, is input to processor 100. Processor 100 adds signals 98 and 108, which are the outputs of the position and rate control loops, and provides output signal 110 to stabilization loop compensation filter processor 112. Processor 112 compensates signal 110 by adjusting its amplitude and phase angle and produces motion control command signals 48. These motion control commands 48 are coupled to motion control device 24 which is placed upon the sensor 32. It should be noted that the compensation mechanism is chosen by standard techniques to trade off system stability and performance and is a function of the actual structural dynamics of the sensor 32 and the sensor's performance requirements.

It should be further noted that the aforementioned rate control loop consists of the interconnection, as shown in FIG. 3, of processors 82, 86, 90, and 92; and signals 44, 28, 30, 36, 84, 88, and 94. Signal 98 represents the output of this rate control loop. The position control loop consists of the interconnection, as shown in FIG. 3, of processor 102 and signals 26, 44, and 104. Signal 104 represents the output of this position control loop. It can be shown that this dual loop control configuration will completely desensitize scanning performance associated with sensor 32 from the position loop band width. Furthermore, orientation errors of the sensor 32 are eliminated if the temporal frequency content of the Fourier transform of the desired orientation is small compared to the band width of the rate control loop.

While it will be apparent that the preferred embodiments of the invention disclosed are well calculated to provide the advantages and features above stated, it will be appreciated that the invention is susceptible to modification, variation, and change without departing from the proper scope or fair meaning of the subjoined claims.

What is claimed is:

1. A measurement and control system comprising:
a scanning sensor;
means for controlling the motion of said sensor with respect to a sensor coordinate system;
inertial measurement system for measuring angular rate of said sensor;
attitude determination unit for determining the relationship between the sensor coordinate system and a reference coordinate system; and
sensor attitude control unit coupled to said attitude determination unit for providing motion control commands to said means for controlling the motion of the sensor, said sensor attitude control unit comprising dual loop processing means for controlling said sensor.

2. The attitude control unit of claim 1 wherein said dual loop processing means utilizes both rate and position loop processing means.

3. The attitude control unit of claim 2 wherein the output of said dual loop processing means comprises a combination of the outputs of said rate and position processing means and wherein said dual loop processing means output is connected to motion control means on said sensor for controlling said sensor's rate and position.

4. The attitude control unit of claim 2 wherein inputs to said rate loop processing means comprise:
(a) the angular rate of a reference coordinate system relative to an inertial coordinate system expressed in terms of the reference coordinate system;
(b) the angular rate of a desired sensor coordinate system relative to the reference coordinate system expressed in terms of the desired coordinate system, and
(c) the angular rate of a sensor coordinate system relative to the inertial coordinate system expressed in terms of the sensor coordinate system.

5. The attitude control unit of claim 2 wherein inputs to said position loop processing means comprises:
(a) the position of a reference coordinate system relative to a desired sensor coordinate system; and
(b) the position of a sensor coordinate system relative to the reference coordinate system.

6. A measurement and control system comprising:
a scanning sensor;
a scanning generation unit for defining a predefined path for said sensor;
control device coupled to said scan generation unit for moving said sensor along said predetermined path;
attitude determination unit for continuously estimating a solution based on a strapdown equation; and
attitude control unit coupled to said attitude determination unit for determining motion control commands based on said strapdown equation solution, said commands being transmitted to said control device.

7. The system of claim 6 wherein said measurement and control system further comprises Kalman filter means for reducing errors associated with said processing means.

8. The system of claim 7 wherein said Kalman filter means has a fiducial residual input signal.

9. The system of claim 8 wherein said Kalman filter means has an output signal comprising an error estimation of said fiducial residual signal.

10. The system of claim 6 wherein said measurement and control system causes said scanned sensor to follow any arbitrary commanded rotational motion defined relative to any arbitrary reference coordinate system.

11. A measurement and control system employing a sensor which is scanned, said system comprising:
(a) scan generation means for providing a first signal representing a position of a reference coordinate system relative to the position of a desired sensor coordinate system, and a second signal representing an angular rate of the desired sensor coordinate system relative to the angular rate of the reference coordinate system, said second signal being expressed in terms of said desired sensor coordinate system;

(b) inertial measurement means, connected to said sensor, having gyroscopic means for providing a third signal representing an angular rate of the sensor relative to an inertial coordinate system, said third signal being expressed in terms of a sensor coordinate system;

(c) navigation means for providing a fourth signal representing the angular rate of the reference coordinate system with respect to the inertial coordinate system, said signal being expressed in terms of the reference coordinate system, and a fifth signal representing the position of the inertial coordinate system relative to the reference coordinate system;

(d) attitude determination means, coupled to the inertial measurement and navigation means, for receiving the third and fifth signals, as well as signals representing the position of the inertial coordinate system with respect to the sensor coordinate system at measurement system initialization, the position of a sensor line of sight coordinate system with respect to the sensor coordinate system, and a fiducial residual signal representing error associated with angular position measurement of a known body; said attitude determination means generating a sixth signal representing the position of the sensor coordinate system relative to the reference coordinate system, and a seventh signal representing the position of the sensor line of sight coordinate system relative to the reference coordinate system;

(e) sensor attitude control means for receiving the first, second, third, fourth and sixth signals and generating an output signal providing motion control commands; and (f) motion control means for moving the sensor in response to motion control commands received from said attitude control means whereby said sensor is scanned with respect to any arbitrarily selected reference coordinate system.

12. The measurement and control system of claim 11 wherein said gyroscopic means is unaffected by cross axis errors and said gyroscopic means is operable at any selected angular acceleration or rate.

13. The measurement and control system of claim 11 wherein said attitude control means comprises dual loop control processing means, utilizing both position and rate signals, for reducing tracking errors associated with said sensor.

14. The measurement and control system of claim 11 wherein said attitude determination means comprises processing means for continually approximating solutions based on a strapdown equation.

15. The measurement and control system of claim 11 wherein said attitude determination means comprises Kalman filter means to which is input said fiducial residual signal and whose output represents estimated errors of measurements associated with said inertial measurement means, said attitude determination means, said fiducial residual signal, and the position of the sensor line of sight coordinate system relative to said sensor coordinate system.

16. The measurement and control system of claim 11 wherein said reference coordinate system is rotating relative to said inertial coordinate system.

17. In a measurement system employing a scanning sensor, the improvement comprising:
inertial measurement means, connected to said scanning sensor, having gyroscopic means for providing a signal representing an angular rate of the sensor relative to an inertial coordinate system, said signal being expressed in terms of a sensor coordinate system; and
wherein said gyroscopic means is unaffected by cross axis errors and is operable at any selected angular acceleration or rate.

18. The improvement of claim 17 wherein said measurement system comprises Kalman filter means for reducing errors associated with said gyroscopic means.

19. The improvement of claim 18 wherein said Kalman Filter means receives a fiducial residual input signal.

20. The improvement of claim 19 wherein said Kalman filter means has an output signal comprising an error estimation of said fiducial residual input signal.

21. A method for causing a scanned sensor to follow any path relative to an arbitrarily selected reference coordinate system, said method comprising:

(a) selecting a reference coordinate system in which said sensor is to be rotated;

(b) generating the orientation of said reference coordinate system relative to a desired sensor coordinate system, and inputting said orientation to control processing means for generating control signals to said sensor;

(c) generating the angular rate of said desired coordinate system relative to said reference coordinate system in terms of said desired coordinate system, and inputting said measurement to said control processing means;

(d) measuring the angular rate of said reference coordinate system relative to an inertial coordinate system and expressing said measurement of angular rate in terms of said reference coordinate system, and inputting said measurement to said control processing means;

(e) measuring the angular rate of said sensor coordinate system relative to said inertial coordinate system and expressing said measurement of angular rate in terms of said sensor coordinate system, and inputting said measurement of angular rate to strapdown equation processing means and to said control processing means;

(f) measuring the initial orientation of the inertial coordinate system relative to said sensor coordinate system and inputting said measurement of initial orientation of the inertial coordinate system relative to said sensor coordinate system to said strapdown equation processing means;

(g) measuring the orientation of the inertial coordinate system with respect to the reference coordinate system and inputting said measurement orientation to multiplication processing means for combining signals;

(h) coupling the output of said strapdown equation processing means to an input of said multiplication processing means; and (i) coupling the output of said multiplication processing means to said control processing means.

22. The method of claim 21 wherein Kalman filter means is connected to said strapdown equation processing means for reducing errors associated with the estimation of said strapdown equation.

23. The method of claim 21 wherein said processing control means comprises dual loop processing control means, utilizing both rate and position signals, for adjusting said sensor's rate and position.

24. The method of claim 23 wherein outputs of said position and rate control processing means are combined together to generate motion control signals to said sensor.

25. The method of claim 21 wherein said strapdown equation processing means continuously estimates solutions to said strapdown equation.

* * * * *